United States Patent
Park et al.

(10) Patent No.: US 11,190,972 B2
(45) Date of Patent: Nov. 30, 2021

(54) METHOD FOR PERFORMING UPLINK TRANSMISSION IN WIRELESS LAN SYSTEM AND TERMINAL USING SAME

(71) Applicant: LG ELECTRONICS INC., Seoul (KR)

(72) Inventors: Hyunhee Park, Seoul (KR); Kiseon Ryu, Seoul (KR); Suhwook Kim, Seoul (KR); Jeongki Kim, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 657 days.

(21) Appl. No.: 16/078,005

(22) PCT Filed: Feb. 17, 2017

(86) PCT No.: PCT/KR2017/001794
§ 371 (c)(1),
(2) Date: Aug. 14, 2018

(87) PCT Pub. No.: WO2017/142356
PCT Pub. Date: Aug. 24, 2017

(65) Prior Publication Data
US 2021/0211927 A1    Jul. 8, 2021

Related U.S. Application Data

(60) Provisional application No. 62/296,606, filed on Feb. 18, 2016.

(51) Int. Cl.
*H04W 28/02*    (2009.01)
*H04W 72/12*    (2009.01)
(Continued)

(52) U.S. Cl.
CPC ... *H04W 28/0278* (2013.01); *H04W 72/1242* (2013.01); *H04W 72/1268* (2013.01);
(Continued)

(58) Field of Classification Search
CPC ......... H04W 28/0278; H04W 72/1242; H04W 72/126; H04W 72/1289; H04B 7/045
See application file for complete search history.

(56) References Cited

U.S. PATENT DOCUMENTS 10,306,603 B1 *  5/2019  Chu .................. H04W 72/0406
2009/0113086 A1  4/2009  Wu et al.
(Continued)

FOREIGN PATENT DOCUMENTS

| KR | 100915604  | 9/2009  |
|----|------------|---------|
| WO | 2014162003 | 10/2014 |
| WO | 2015199306 | 12/2015 |

OTHER PUBLICATIONS

PCT International Application No. PCT/KR2017/001794, International Search Report, dated May 26, 2017, 18 pages.
(Continued)

*Primary Examiner* — Kashif Siddiqui
(74) *Attorney, Agent, or Firm* — Lee, Hong, Degerman, Kang & Waimey

(57) ABSTRACT

A method for performing uplink transmission in a wireless LAN system according to an embodiment of the present specification may comprise the steps of: receiving, by an AP, a buffer state report frame from a reception STA coupled to the AP, wherein the buffer state report frame is a frame in which a first frame and a second frame are aggregated, the first frame including a first traffic identifier indicating a transmission priority of a first traffic buffered in the reception STA and first queue size information indicating the amount of the buffered first traffic, and the second frame
(Continued)

including a second traffic identifier indicating a transmission priority of a second traffic buffered in the reception STA and second queue size information indicating the amount of the buffered second traffic; and transmitting, by the AP, a trigger frame for a plurality of user STAs participating in UL MU transmission on the basis of a buffer state report frame.

20 Claims, 23 Drawing Sheets

(51) Int. Cl.
  *H04B 7/0452* (2017.01)
  *H04W 72/10* (2009.01)
(52) U.S. Cl.
  CPC ....... *H04W 72/1289* (2013.01); *H04B 7/0452* (2013.01); *H04W 72/10* (2013.01)

(56) References Cited

U.S. PATENT DOCUMENTS

| | | | | |
|---|---|---|---|---|
| 2009/0125650 | A1* | 5/2009 | Sebire | H04L 47/30 710/57 |
| 2010/0135166 | A1* | 6/2010 | Ahluwalia | H04L 47/14 370/252 |
| 2010/0284314 | A1* | 11/2010 | Pelletier | H04L 47/30 370/310 |
| 2015/0327116 | A1 | 11/2015 | Zhang et al. | |
| 2016/0081109 | A1* | 3/2016 | Li | H04W 28/0278 370/329 |
| 2017/0170937 | A1* | 6/2017 | Chun | H04B 7/0452 |
| 2017/0230860 | A1* | 8/2017 | Li | H04W 28/0278 |
| 2017/0230964 | A1* | 8/2017 | Park | H04B 7/0452 |
| 2018/0014334 | A1* | 1/2018 | Ahn | H04W 72/04 |
| 2018/0167882 | A1* | 6/2018 | Choi | H04W 72/121 |
| 2018/0206260 | A1* | 7/2018 | Khoryaev | H04W 72/1289 |
| 2018/0310338 | A1* | 10/2018 | Li | H04W 28/06 |

OTHER PUBLICATIONS

Section 9.3.1.9.7 of IEEE P802.11ax/D1.0, "Draft Standard for Information technology—Tele-communications and information exchange between systems Local and metropolitan area networks—Specific requirements", Part 11: Wireless LAN Medium Access Conlrol (MAC) and Physical Layer (PHY) Specifications, Nov. 2016, 21 pages.

Section 27.10.4 of IEEE P802.11ax/D1.0, "Draft Standard for Information technology—Tele-communications and information exchange between systems Local and metropolitan area networks—Specific requirements", Part 11: Wireless LAN Medium Access Conlrol (MAC) and Physical Layer (PHY) Specifications, Nov. 2016, 21 pages.

* cited by examiner

FIG. 1
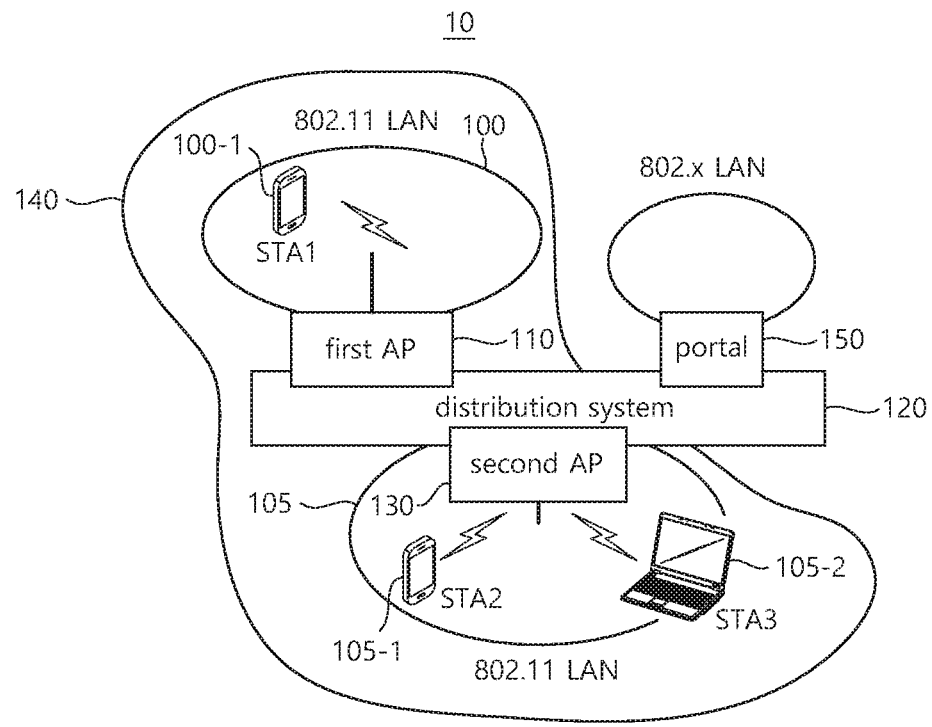
(A)
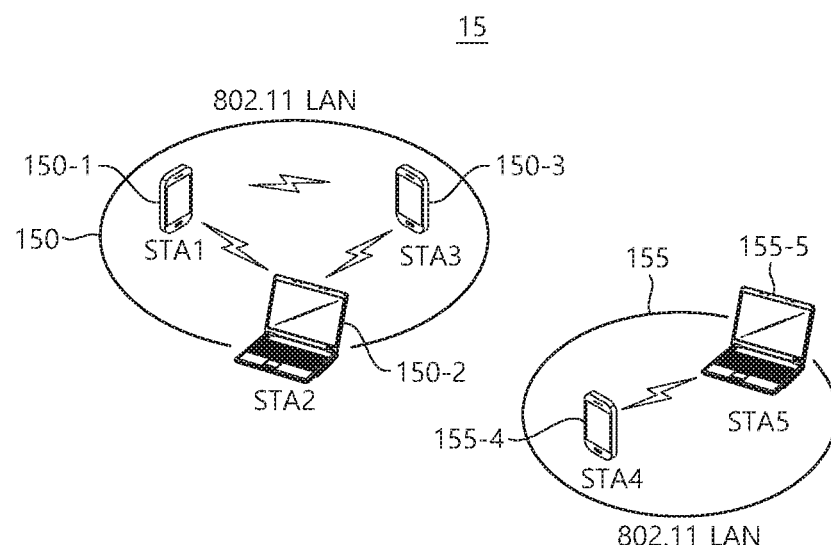
(B)

FIG. 22

| Traffic type (2210) | AC bitmap (2220) | | Scale Factor (2230) | | reserve (2240) | Queue Size (bit 0-15) (2250) | |
|---|---|---|---|---|---|---|---|
| 2 bits | 2 bits | | 4 bits (bit 0-3) | | 2 bits | 8 bits | 8 bits |
| | | | bit 0-1 | bit 2-3 | | bit 0-7 | bit 8-15 |
| 0 0 | rev | | rev | rev | rev | rev | rev |
| 0 1 | AC_BE | AC_BK | SF(AC_BE) | SF(AC_BK) | rev | Queue Size (AC_BE) | Queue Size (AC_BK) |
| 1 0 | AC_VO | AC_VI | SF(AC_VO) | SF(AC_VI) | rev | Queue Size (AC_VO) | Queue Size (AC_VI) |
| 1 1 | rev | | SF(DS) | SF(DT) | rev | A-Queue Size_DS | A-Queue Size_DT |

METHOD FOR PERFORMING UPLINK TRANSMISSION IN WIRELESS LAN SYSTEM AND TERMINAL USING SAME

CROSS-REFERENCE TO RELATED APPLICATIONS

This application is the National Stage filing under 35 U.S.C. 371 of International Application No. PCT/KR2017/001794, filed on Feb. 17, 2017, which claims the benefit of U.S. Provisional Application No. 62/296,606, filed on Feb. 18, 2016, the contents of which are all hereby incorporated by reference herein in its entirety.

BACKGROUND OF THE INVENTION

Field of the Invention

The present specification relates to wireless communication and, more particularly, to a method for performing uplink transmission in a wireless local area network system and a terminal using the same.

Related Art

With the advancement of information and communication technology, various wireless communication techniques have been developed in recent years. In particular, a wireless local area network (hereinafter, "WLAN") is a technology that enables wireless access to the Internet at home or in an office or a particular service area using a portable device on the basis of radio frequency technologies.

The portable device may be, for example, a personal digital assistant (PDA), a portable computer (laptop), or a portable multimedia player (PMP). Generally, device-to-device communication in a WLAN system is performed via a management entity, such as a base station or an access point (AP). The management medium is responsible for scheduling for data communication.

Various protocols for direct communication between devices without a management medium are proposed in order to achieve flexibility in communication between devices in a WLAN system. NAN is a specification established by Wi-H Alliance (WFA) on the basis of the Wi-Fi standards. The NAN specification specifies synchronization and discovery procedures for devices in a frequency band of 2.5 GHz or 5 GHz.

SUMMARY OF THE INVENTION

An aspect of the present specification is to provide a method for performing uplink transmission in a wireless local area network system (WLAN) with improved performance and a terminal using the same.

The present specification relates to a method for performing uplink transmission in a WLAN. According to one embodiment, the method for performing uplink transmission in the WLAN may include:

receiving, by an access point (AP), a buffer state report frame from a receiving station (STA) associated with the AP, wherein the buffer state report frame is a frame in which a first frame and a second frame are aggregated, the first frame including a first traffic identifier (TID) indicating a transmission priority level of first traffic buffered in the receiving STA and first queue size information indicating a amount of the buffered first traffic and the second frame including a second TID indicating a transmission priority level of second traffic buffered in the receiving STA and second queue size information indicating a amount of the buffered second traffic; and transmitting, by the AP, a trigger frame for a plurality of user STAs participating in uplink multi-user (UL MU) transmission on the basis of the received buffer state report frame.

According to one embodiment of the specification, there are provided a method for performing uplink transmission in a WLAN with improved performance and a terminal using the same.

BRIEF DESCRIPTION OF THE DRAWINGS

FIG. 1 is a conceptual view illustrating the structure of a wireless local area network.

FIG. 22 is a diagram illustrating a plurality of sub-fields of a Control Information field according to an embodiment.

DESCRIPTION OF EXEMPLARY EMBODIMENTS

Figure 2:
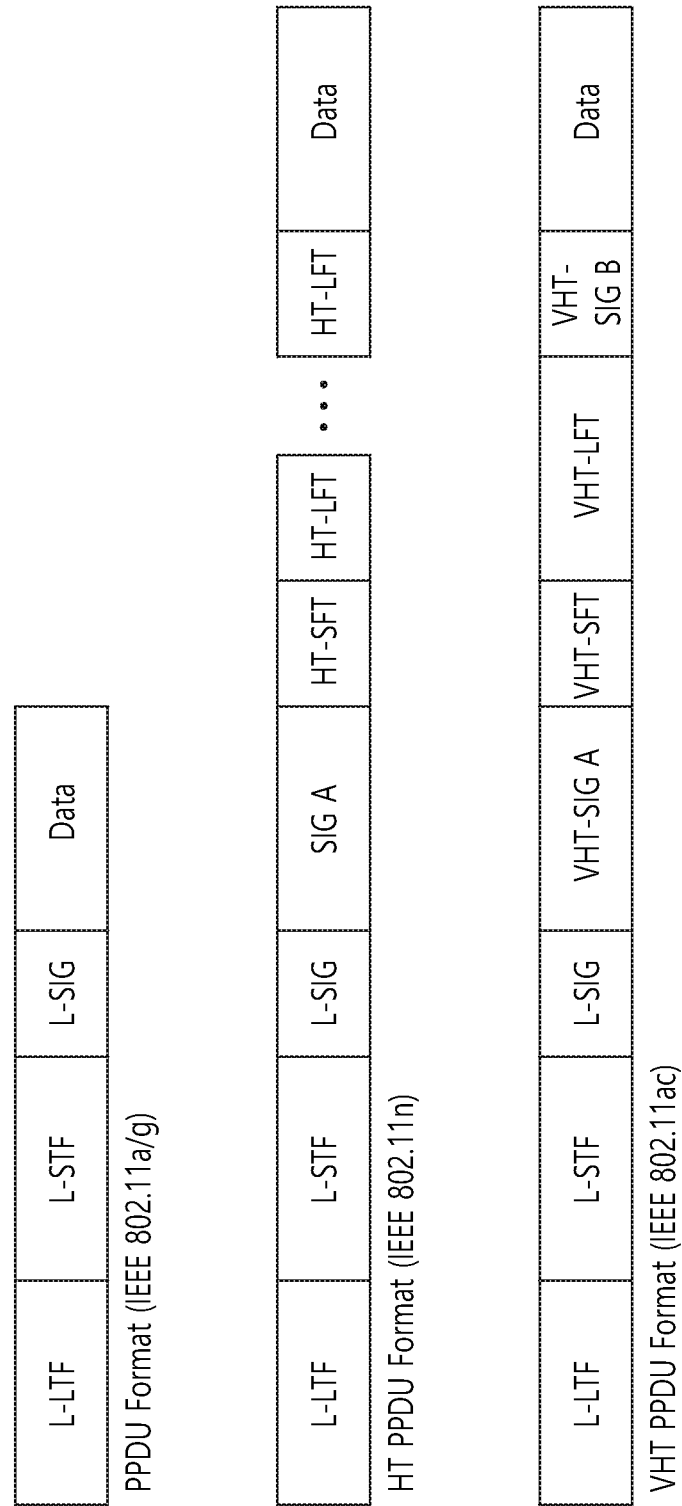
FIG. 2 is a diagram illustrating an example of a PPDU used in an IEEE standard.

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

FIG. 1 is a conceptual view illustrating the structure of a wireless local area network (WLAN). FIG. 1(A) illustrates the structure of an infrastructure basic service set (BSS) of institute of electrical and electronic engineers (IEEE) 802.11.

Referring the FIG. 1(A), the wireless LAN system 10 of the FIG. 1(A) may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, the BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1(A), a network between the APs 110 and 130 and a network between the APs 110 and 130 and the STAs 100-1, 105-1, and 105-2 may be implemented.

FIG. 1(B) illustrates a conceptual view illustrating the IBSS.

Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1(B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
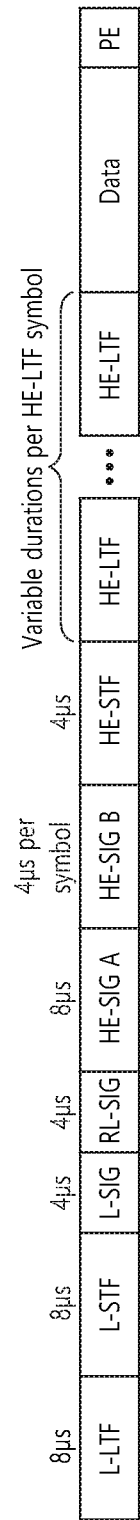
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
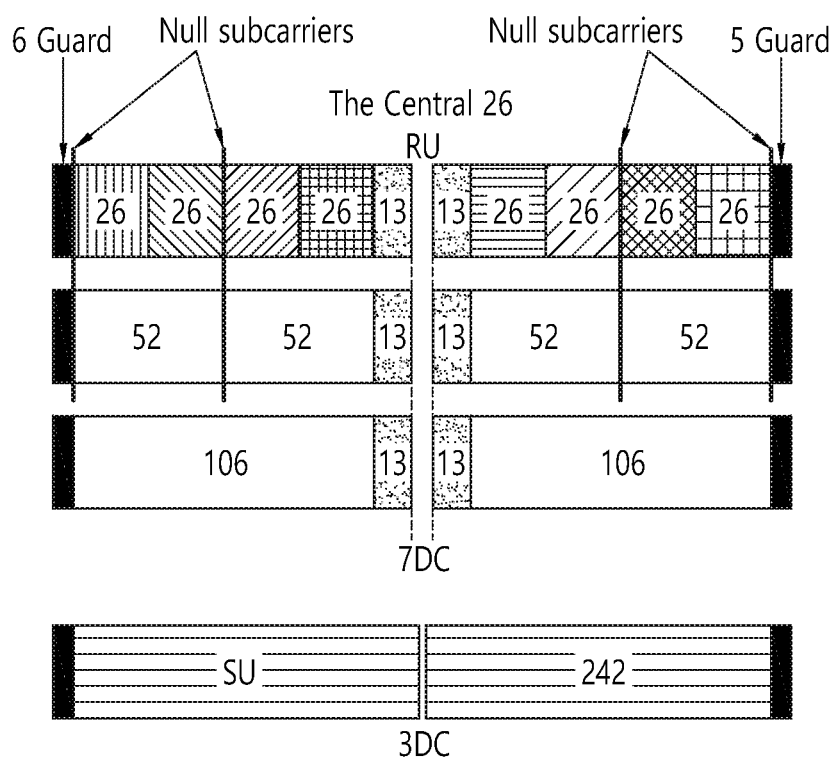
FIG. 4 is a diagram illustrating a layout of resource units used in a band of 20 MHz.

FIG. 4 is a diagram illustrating a layout of resource units (RUs) used in a band of 20 MHz. As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
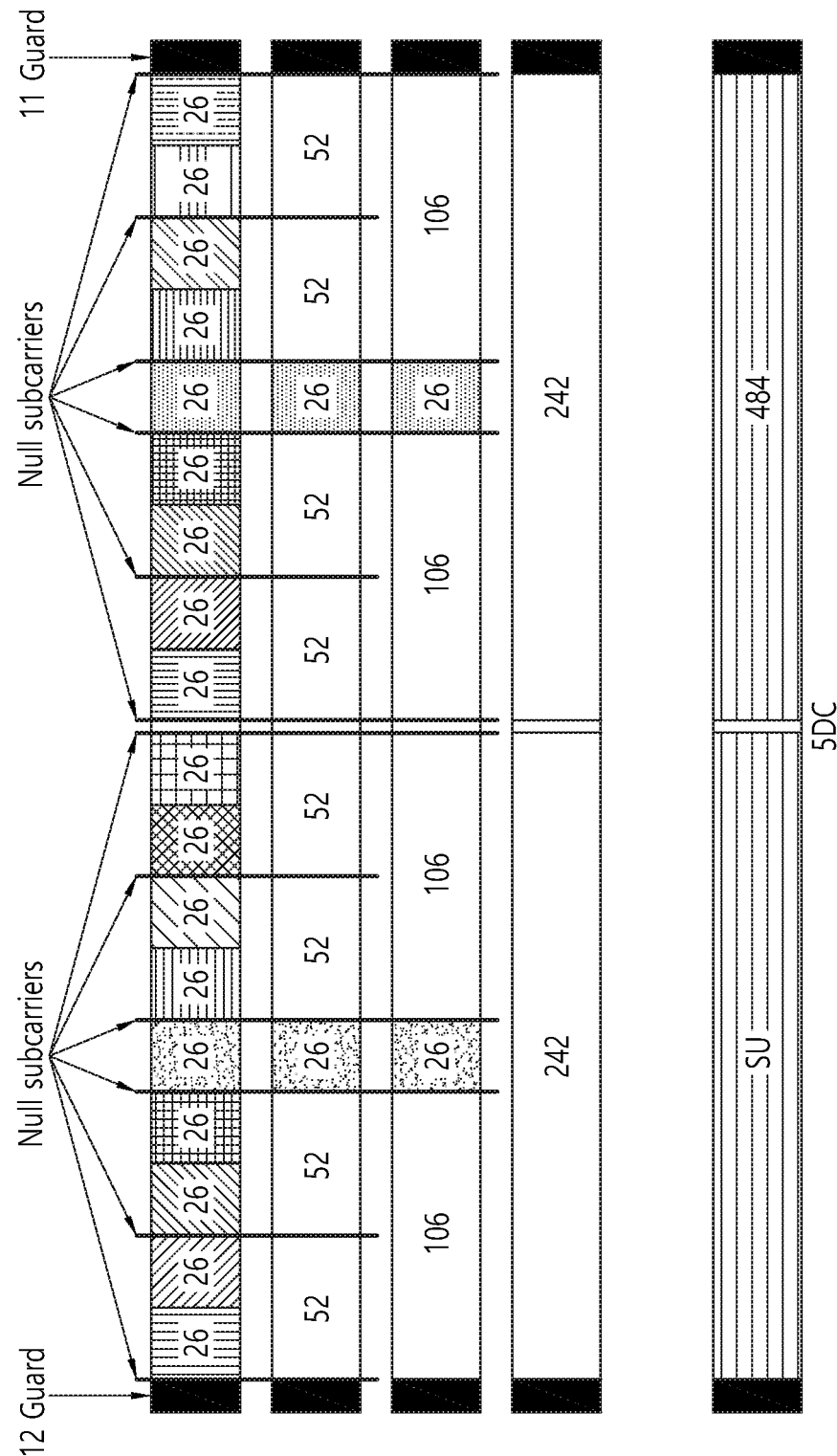
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
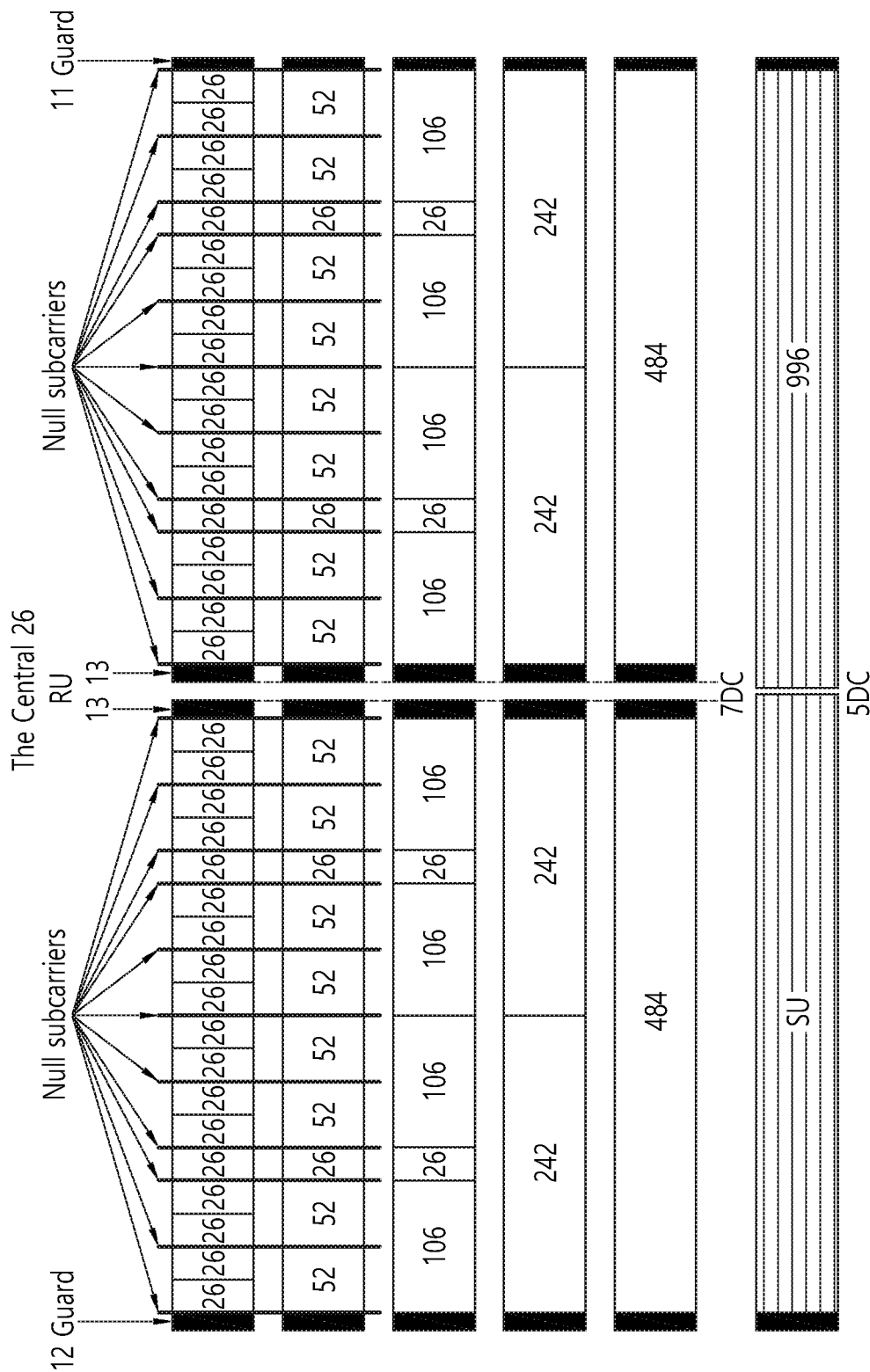
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
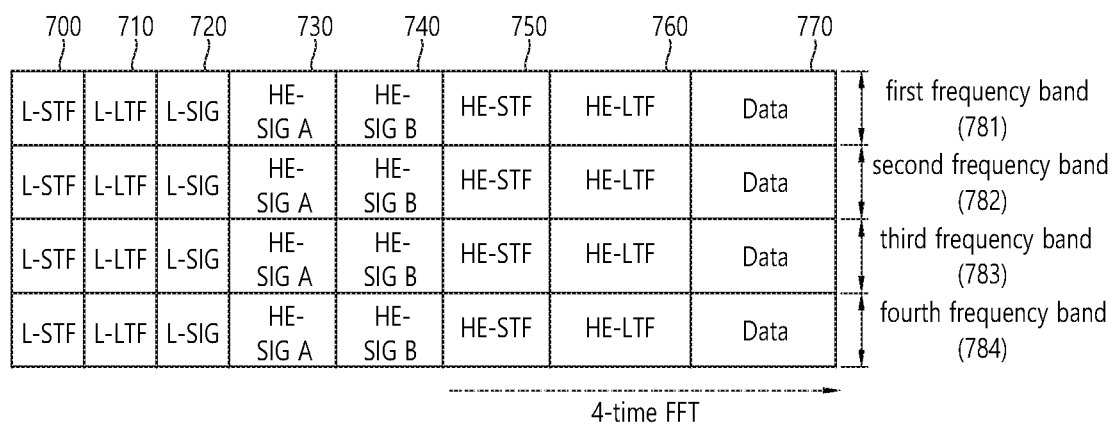
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

The HE-SIG-B 740 will be described below in a greater detail with reference to FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a term called downlink data (alternatively, a downlink frame), and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
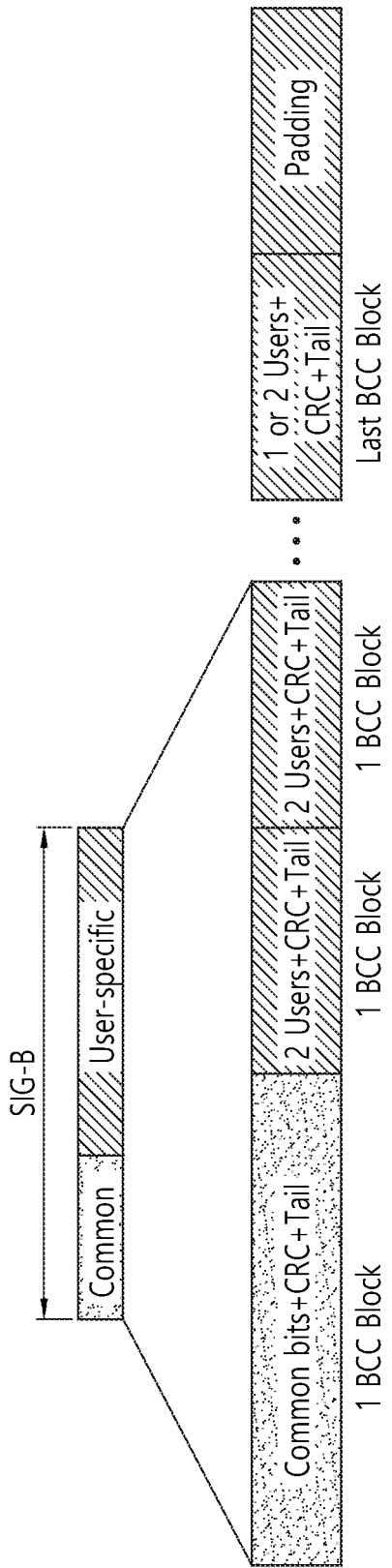
FIG. 8 is a block diagram illustrating one example of HE-SIG-B.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows there behind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
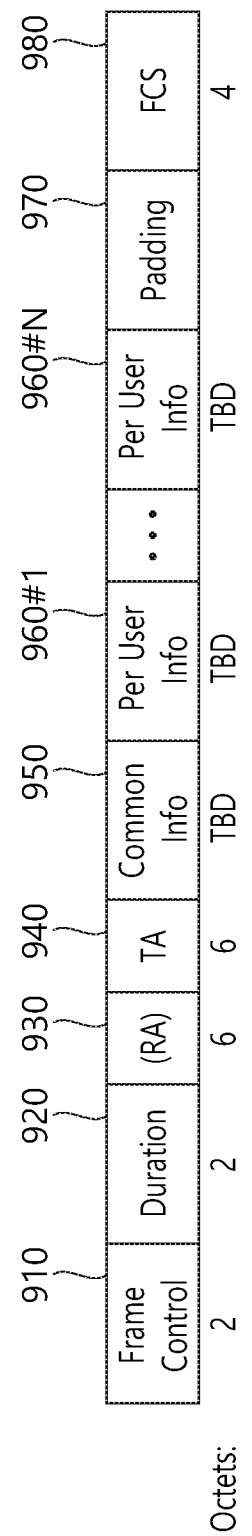
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
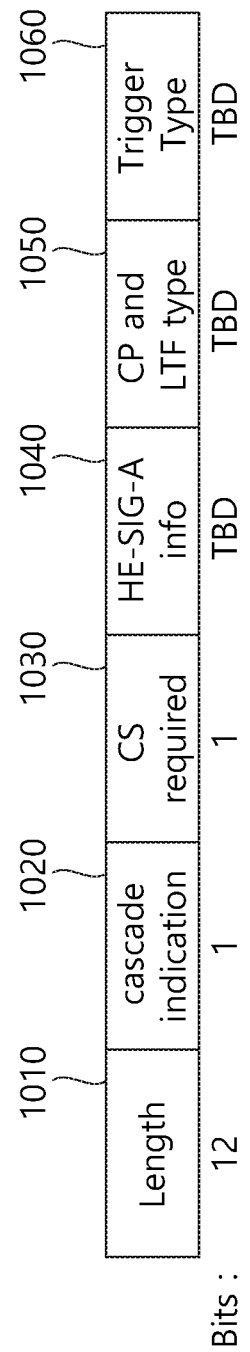
FIG. 10 illustrates an example of a common information field.

FIG. 10 illustrates an example of a common information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
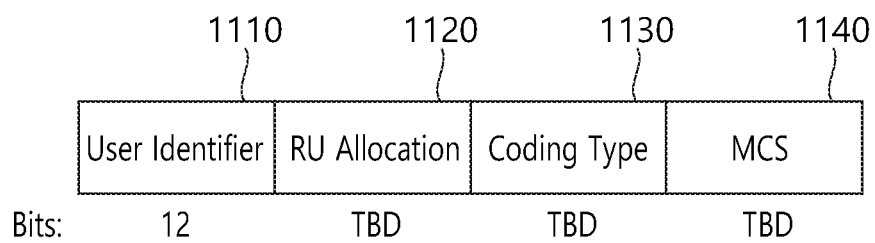
FIG. 11 illustrates an example of a sub-field included in a per user information field.

FIG. 11 illustrates an example of a sub-field included in a per user information field. Some of the sub-fields illustrated in FIG. 11 may be omitted, and other sub-fields may be added. Further, the length of each illustrated sub-field may be varied.

A User Identifier field 1110 indicates an identifier (ID) of an STA (i.e., a receiving STA) which corresponds to the per user information, and an example of the ID may be the entirety or part of an AID.

A RU Allocation field 1120 may be included in the per user information field. Specifically, when the receiving STA, which is identified by the User Identifier field 1110, transmits an uplink PPDU in response to the trigger frame of FIG. 9, the STA transmits the uplink PPDU via a RU indicated by the RU Allocation field 1120. In this case, it is preferable that the RU indicated by the RU Allocation field 1120 corresponds to the RU illustrated in FIG. 4, FIG. 5, or FIG. 6.

The sub-fields of FIG. 11 may include a Coding Type field 1130. The Coding Type field 1130 may indicate the coding type of the uplink PPDU transmitted in response to the trigger frame of FIG. 9. For example, when BBC coding is applied to the uplink PPDU, the Coding Type field 1130 may be set to '1'. When LDPC coding is applied to the uplink PPDU, the Coding Type field 1130 may be set to '0'.

The sub-fields of FIG. 11 may include a MCS field 1140. The MCS field 1140 may indicate a MCS scheme applied to the uplink PPDU transmitted in response to the trigger frame of FIG. 9.

Figure 12:
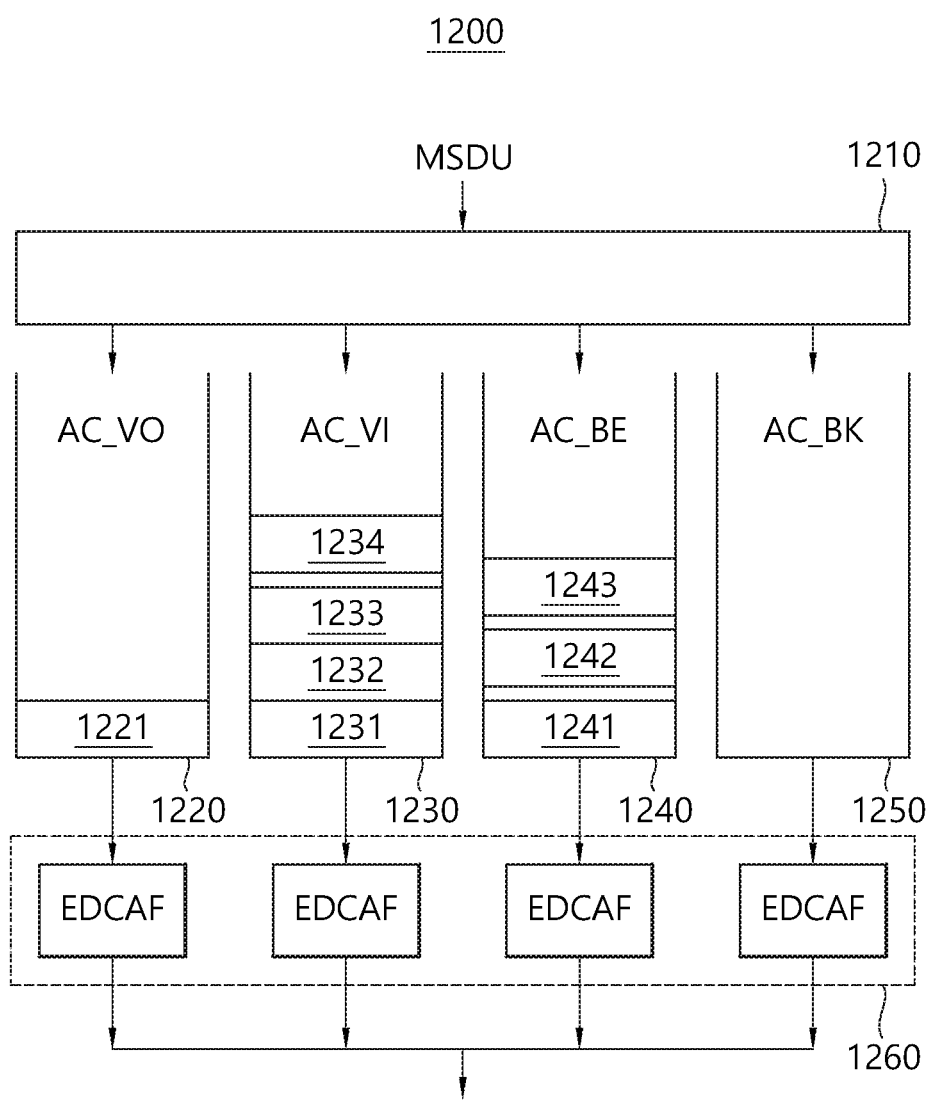
FIG. 12 is a conceptual view illustrating an STA that performs EDCA-based channel access in a WLAN system according to an embodiment.

FIG. 12 is a conceptual view illustrating an STA that performs EDCA-based channel access in a WLAN system according to an embodiment. An STA (or AP) that performs channel access based on enhanced distributed channel access (EDCA) in a WLAN system may perform channel access according to a plurality of user priority levels defined for traffic data.

For transmission of a Quality of Service (QoS) data frame based on a plurality of user priority levels, four access categories ("ACs") (i.e., AC_BK (background), AC_BE (best effort), AC_VI (video), and AC_VO (voice)) may be defined for EDCA.

The STA that performs channel access on the basis of EDCA may map traffic data, that is, a MAC service data unit (MSDU), transmitted from a logical link control (LLC) layer to a MAC layer as illustrated below in Table 1. Table 1 is an illustrative table showing mapping between user priority levels and the ACs.

TABLE 1

| Priority level | User priority level | Access Category (AC) |
|---|---|---|
| Low | 1 | AC_BK |
| | 2 | AC_BK |
| | 0 | AC_BE |
| | 3 | AC_BE |
| | 4 | AC_VI |
| | 5 | AC_VI |
| | 6 | AC_VO |
| High | 7 | AC_VO |

A transmission queue and an AC parameter may be defined for each AC. A plurality of user priority levels may be provided on the basis of an AC parameter values set differently for each AC.

That is, when the STA performing channel access on the basis of EDCA performs a backoff procedure for transmitting a frame belonging to each AC, the STA may use to arbitration interframe space (AIFS)[AC], CWmin[AC], and CWmax[AC] instead of a distributed coordination function (DCF) interframe space (DIFS), CWmin, and CWmax, which are parameters based on a DCF.

The EDCA parameters used for the backoff procedure for each AC may be set to default values or may be transmitted from an AP to each STA via a beacon frame. As AIFS[AC] and CWmin[AC] values decrease, channel access delay is reduced. Accordingly, a corresponding STA may have a high priority level and may use a large number of bands in a given traffic environment.

An EDCA parameter set element may include information on a channel access parameter (e.g., AIFS[AC], CWmin [AC], and CWmax[AC]) for each AC.

When a collision occurs between STAs occurs while an STA is transmitting a frame, an EDCA backoff procedure for generating a new backoff count is performed similarly to a conventional DCF backoff procedure. However, a differentiated backoff procedure for each AC of EDCA may be performed on the basis of an EDCA parameter individually set for each AC. An EDCA parameter may be an important factor used to differentiate channel access for traffic with various user priority levels.

Properly setting an EDCA parameter value defined for each AC may optimize network performance and may increase transmission effects by the priority level of traffic. Thus, the AP may perform overall management and coordination functions on EDCA parameters to guarantee all STAs participating in a network fair access to media.

Referring to FIG. 12, one STA (or AP) 1200 may include a virtual mapper 1210, a plurality of transmission queues 1220 to 1250, and a virtual collision handler 1260.

The virtual mapper 1210 of FIG. 12 may serve to map a MSDU received from a LLC layer to a transmission queue corresponding to each AC according to Table 1, which is illustrated above.

The plurality of transmission queues 1220 to 1250 of FIG. 12 may serve as individual EDCA contention entities for wireless media access within one STA (or AP).

For example, a transmission queue 1220 of an AC VO type of FIG. 12 may include one frame 1221 for a second STA (not shown). A transmission queue 1230 of an AC VI type may include three frames 1231 to 1233 for a first STA (not shown) and one frame 1234 for a third STA according to the order in which the frames are to be transmitted to a physical layer.

A transmission queue 1240 of an AC BE type of FIG. 12 may include one frame 1241 for the second STA (not shown), one frame 1242 for the third STA (not shown), and one frame 1243 for the second STA (not shown) according to the order in which the frames are to be transmitted to the physical layer.

A transmission queue 1250 of an AC BK type of FIG. 12 may not include a frame to be transmitted to the physical layer.

When there are two or more ACs for which the back-off procedure has been completed at the same time, a collision between the ACs may be coordinated according to a function (EDCA function (EDCAF)) included in the virtual collision handler 1260. That is, a frame belonging to an AC with the highest priority level may be transmitted first. In addition, the other ACs may increase a contention window value and may then update a value set as a backoff count.

A transmission opportunity (TXOP) may be started when a channel is accessed in accordance with an EDCA rule. When two or more frames are accumulated in one AC, and if an EPCA TXOP is acquired, the AC of an EDCA MAC layer may attempt to transmit a plurality of frames. When the STA has already transmitted one frame, and if the STA can transmit a next frame in the same AC and can receive the ACK of the next frame within the remaining TXOP time, the STA attempts to transmit the next frame after a time interval of SIFS.

A TXOP limit value may be set as a default value in the AP and the STA, or a frame associated with the TXOP limit value may be transmitted to the STA from the AP.

When the size of a data frame to be transmitted exceeds the TXOP limit value, the STA may fragment the frame into a plurality of smaller frames. Subsequently, the fragmented frames may be transmitted within a range that does not exceed the TXOP limit value.

Figure 13:
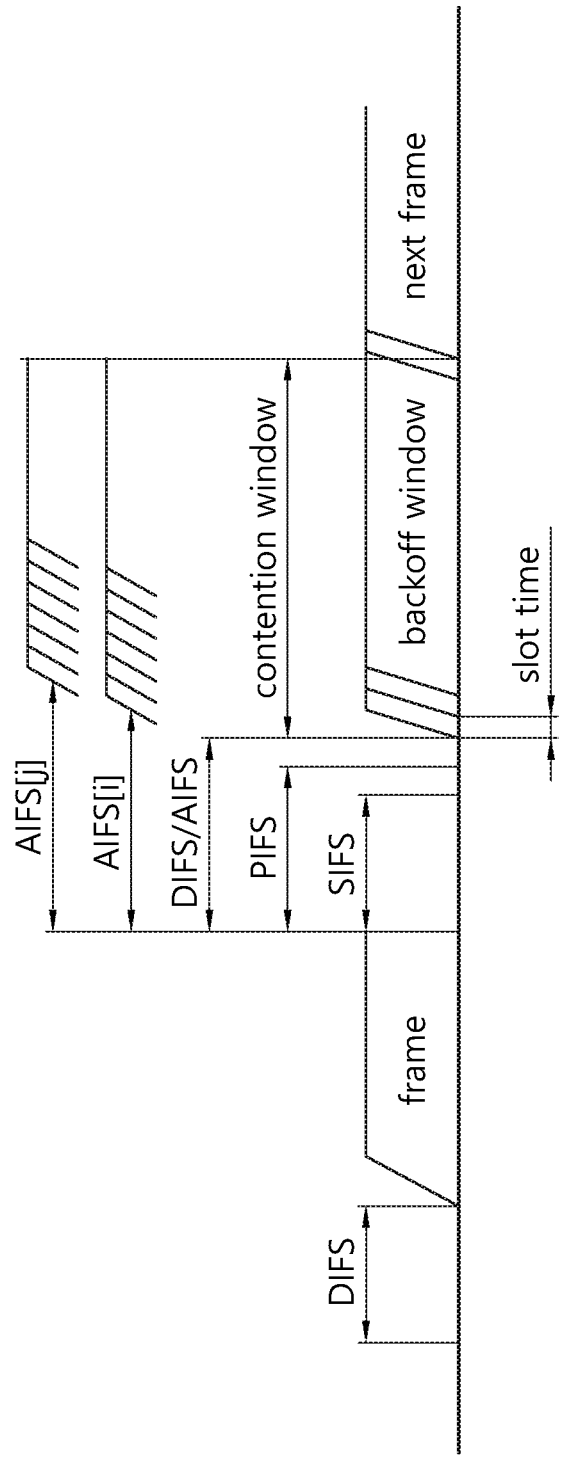
FIG. 13 is a conceptual view illustrating a backoff procedure of EDCA according to an embodiment.

FIG. 13 is a conceptual view illustrating a backoff procedure of EDCA according to an embodiment. Referring to FIGS. 12 and 13, for each traffic data transmitted from an STA, a backoff procedure may be performed in accordance with contention-based EDCA according to the priority level. For example, priority levels assigned to individual traffic data may be divided into eight levels as illustrated above in Table 1.

As described above, one STA (or AP) has different output queues according to the priority level, and each output queue operates according to the EDCA rule. Each output queue may transmit traffic data using different arbitration interframe spaces (AIFSs) according to the priority level instead of a DIFS conventionally used.

Further, when the STA (or AP) needs to transmit traffic having different priority levels at the same time, the STA may transmit traffic having a higher priority level first, thereby preventing a collision in the STA (or AP).

To start the backoff procedure, each STA (or AP) sets the backoff time Tb[i] of a backoff timer. The backoff time Tb[i] is a pseudo-random integer value and may be calculated using Equation 1 illustrated below:

$$T_b[i] \text{Random}(i) \times \text{SlotTime} \qquad \text{[Equation 1]}$$

where Random(i) denotes a function to generate a random integer ranging from 0 to CW[i] using uniform distribution, CW[i] denotes a contention window ranging from a minimum contention window CWmin[i] to a maximum contention window CWmax[i], and i denotes a traffic priority level.

When the STA performing the backoff procedure transmits a frame, if retransmission is required due to the occurrence of a collision, Equation 2 illustrated below may be used. That is, whenever a collision occurs, a new contention window $CW_{new}[i]$ may be calculated using the previous window $CW_{old}[i]$.

$$CW_{new}[i] = ((CW_{old}[i]+1) \times PF) - 1 \qquad \text{[Equation 2]}$$

Here, the PF value may be calculated according to a procedure defined in the IEEE 802.11e standard. The CWmin [i], AIFS [i] and PF values as EDCA parameters may be set to default values for each STA (or AP) or may be signaled from the AP through a QoS parameter set element, which is a management frame.

Hereinafter, in an embodiment of the present invention, a terminal may be a device capable of supporting both a WLAN system and a cellular system. That is, the terminal may be understood as a UE supporting a cellular system or a STA supporting a WLAN system.

When a backoff procedure for the transmission queue 1230 of the AC VI type of FIG. 12 is terminated first on the basis of Equations 1 and 2, the transmission queue 1230 of the AC VI type may obtain a transmission opportunity (hereinafter, 'TXOP') to access a medium.

The AP 1200 of FIG. 12 may determine the transmission queue 1230 of the AC VI type as a primary AC and may determine the remaining transmission queues 1220, 1240, and 1250 as secondary ACs.

A process in which a backoff procedure is performed for a plurality of transmission queues 1220 to 1250 and a transmission queue for which the backoff procedure is completed first is determined as a primary AC may be referred to as a primary AC rule.

A transmission opportunity period according to the TXOP may be determined on the basis of a primary AC determined by the primary AC rule. Further, frames included in a secondary AC may be transmitted together in the TXOP period determined on the basis of the primary AC.

Figure 14:
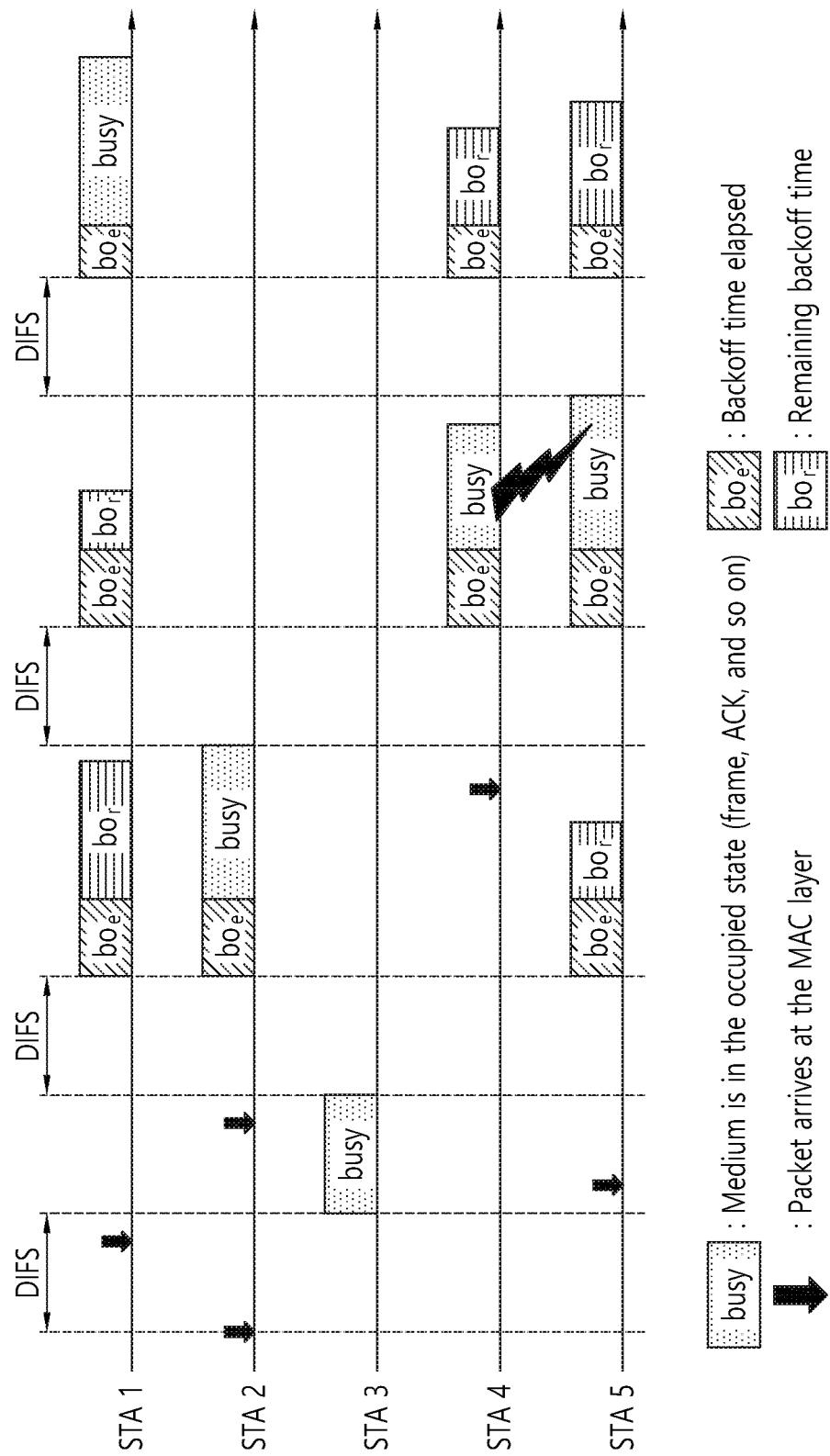
FIG. 14 illustrates a backoff period and a frame transmission procedure in a wireless communication system according to the present specification.

FIG. 14 illustrates a backoff period and a frame transmission procedure in a wireless communication system according to the present specification.

Referring to FIGS. 13 and 14, when a specific medium is changed from an occupied or busy state to an idle state, a plurality of STAs may attempt to transmit data (or frames). Here, to minimize collisions between STAs, each STA may select a backoff time Tb[i], may wait for a slot time corresponding to the backoff time, and may then attempt transmission.

When a backoff procedure is started, the STA may count down the determined backoff count time in slot times and may continue to monitor the medium during the countdown. When the monitored medium is in the occupied state, the STA may stop the countdown and may wait. When the monitored medium is in the idle state, the STA may resume the countdown.

Referring to FIG. 14, when a packet for STA 3 reaches the MAC layer of STA 3, STA 3 determines that the medium is idle during a DIFS and may immediately transmit a frame. Although FIG. 14 illustrates a DIFS as an interframe space (IFS), it would be understood that the present specification is not limited thereto.

The remaining STAs may monitor that the medium is in the occupied state and may wait. During this time, STA 1, STA 2 and STA 5 may have data to transmit. When the medium is monitored to be idle, each STA may wait for a DIFS and may then count down the individual backoff time selected by each STA.

Referring to FIG. 14, STA 2 selects the shortest backoff time, and STA 1 selects the largest backoff count value. FIG. 14 shows that the remaining backoff time of STA 5 is shorter than the remaining backoff time of STA 1 at the time when STA 2 completes the backoff procedure for the selected backoff time and starts frame transmission.

While STA 2 occupies the medium, STA 1 and STA 5 may stop the backoff procedure and wait. When the medium occupied by STA2 is released and returns to the idle state, STA 1 and STA 5 may resume the backoff procedure on the basis of the remaining backoff time suspended after waiting for a DIFS. In this case, since the remaining backoff time of STA 5 is shorter than that of STA 1, STA 5 may transmit a frame before STA 1.

While STA 2 occupies the medium, data to be transmitted by STA 4 may reach the MAC layer of STA 4. When the medium becomes idle, STA 4 may wait for a DIFS and may then perform the backoff procedure by counting down the backoff time selected by STA 4.

As the remaining backoff time of STA 5 may accidentally coincide with the backoff time of STA 4, a collision may occur between STA 4 and STA 5. When a collision occurs between the STAs, both STA 4 and STA 5 cannot receive an ACK and thus fail to transmit data.

Accordingly, STA 4 and STA 5 may individually calculate a new contention window $CW_{new}[i]$ according to Equation 2. STA 4 and STA 5 may count down a backoff time newly computed according to Equation 1.

Meanwhile, while the medium is occupied due to transmission by STA 4 and STA 5, STA 1 may wait. Then, when the medium returns to the idle state, STA 1 waits for a DIFS and resumes the backoff count. After the remaining backoff time elapses, STA 1 may transmit a frame.

The CSMA/CA mechanism may also include virtual carrier sensing in addition to physical carrier sensing in which an AP and/or STA directly senses a media.

Virtual carrier sensing is intended to solve any problems that may occur during media access, such as a hidden node problem. For virtual carrier sensing, the MAC of a WLAN system uses a network allocation vector (NAV). The NAV is a value that corresponds to the time remaining until a medium becomes available, which is signaled by an AP and/or STA currently using the medium or having the right to use the medium to another AP and/or STA. Therefore, a set NAV value corresponds to a period during which a medium is scheduled to be used by an AP and/or STA transmitting a corresponding frame, and an STA receiving the NAV value is prohibited from accessing the medium during the corresponding period.

Figure 15:
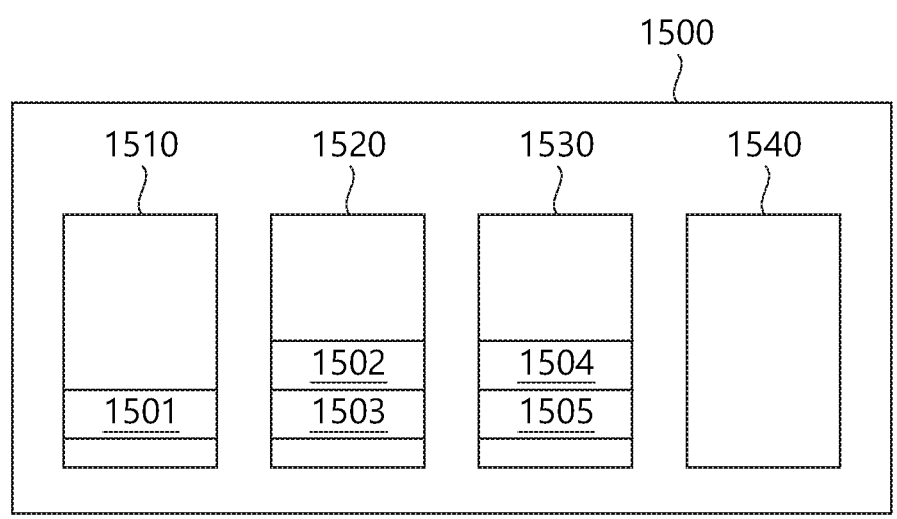
FIG. 15 is a block diagram illustrating the inside of a STA that performs channel access in a WLAN system according to an embodiment.

FIG. 15 is a block diagram illustrating the inside of a STA that performs channel access in a WLAN system according to an embodiment. Referring to FIGS. 12 and 15, the STA 1500 of FIG. 15 may include first to fourth transmission queues 1510, 1520, 1530, and 1540. The first to fourth transmission queues 1510, 1520, 1530, and 1540 of FIG. 15 may correspond to the four access categories (AC_VO (voice), AC_VI (video), AC_BK (background), and AC_BE (best effort)) illustrated in FIG. 12. Although not shown in FIG. 15, it will be understood that the STA 1500 of FIG. 15 may further include other components 1210 and 1260 of the STA 1200 of FIG. 12.

For a concise description of FIG. 15, it may be assumed that a first transmission queue 1510 corresponds to AC_VO, a second transmission queue 1520 corresponds to AC_VI, a third transmission queue 1530 corresponds to AC_BE, and a fourth transmission queue 1540 corresponds to AC_BK.

Referring to Table 1, in the present specification, a value assigned for a user priority level (i.e., 0 to 7) may be understood as a traffic identifier (hereinafter, 'TID'). The STA 1500 of FIG. 15 may classify traffic (e.g., MSDU) received from a higher layer into transmission queues 1510, 1520, 1530, and 1540 on the basis of a TID.

Referring to FIG. 15, when the TID of traffic is set to a value of 6 or 7, the traffic may be buffered in the first transmission queue 1510. For example, first traffic 1501 with the TID set to 6 or 7 may be buffered in the first transmission queue 1510.

When the TID of traffic is set to a value of 4 or 5, the traffic may be buffered in a second transmission queue 1520. For example, second traffic 1502 with the TID set to 4 and third traffic 1503 with the TID set to 5 may be buffered in the second transmission queue 1520.

When the TID of traffic is set to a value of 0 or 3, the traffic may be buffered in a third transmission queue 1530. For example, fourth traffic 1504 with the TID set to 0 and fifth traffic 1505 with the TID set to 3 may be buffered in the third transmission queue 1530. It will be understood that a detailed description of each AC is the same as that made with reference to FIG. 12.

Figure 16:
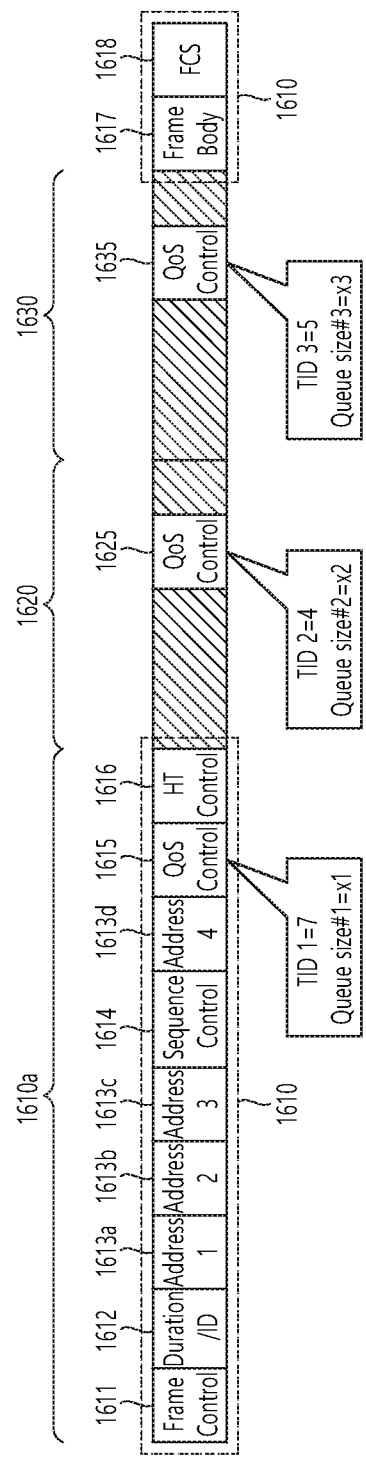
FIGS. 16 and 17 illustrate the format of a frame for a buffer state report of an STA according to an embodiment.
Figure 17:
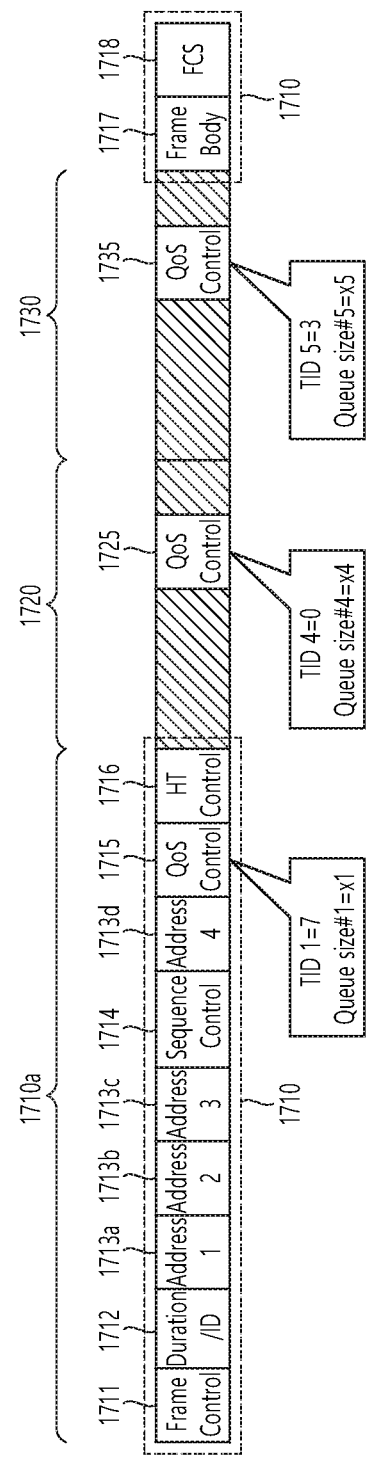

FIGS. 16 and 17 illustrate the format of a frame for a buffer state report of an STA according to an embodiment.

For a concise and clear description of FIGS. 16 and 17, it may be assumed that first to third frames 1610, 1620, and 1630 illustrated in FIG. 16 correspond to a QoS data frame or QoS null frame.

For reference, a QoS null frame may refer to a frame that has the same field configuration as a QoS data frame but does not include a frame body field (e.g., 1617) unlike a QoS data frame.

Referring to FIG. 16, a frame for a buffer state report of FIG. 16 (hereinafter, 'BSR frame') may be a frame into which the first to third frames 1610, 1620, and 1630 are aggregated.

The first frame 1610 may include a first MAC header 1610a including a plurality of fields 1611 to 1616, a Frame Body field 1617 having a payload with a variable length and a 32-bit FCS field 1618. A Frame Control field 1611, a Duration/ID field 1612, an Address 1 field 1613a, and a FCS field 1618 may be included in any type of an MAC frame.

An Address 2 field 1613b, an Address 3 field 1613c, an Address 4 field 1613d, a Sequence Control field 1614, a QoS Control field 1615, a HT Control field 1616, and a Frame Body field 1617 may be selectively included depending on the type of an MAC frame. When a QoS data frame or a QoS null frame is indicated by the Frame Control field 1611, the QoS Control field 1615 of FIG. 16 may be included in an MAC frame.

Although not shown in FIG. 16, the second and third frames 1620 and 1630 may include the same fields as the plurality of fields included in the foregoing first frame 1610.

In particular, the first to third frames 1610, 1620, and 1630 in FIG. 16 may include QoS Control fields 1615, 1625, and 1635, respectively.

The QoS Control fields 1615, 1625, and 1635 may be configured with two octets (16 bits). Specifically, the QoS Control fields 1615, 1625, and 1635 may be configured as illustrated below in Table 2.

TABLE 2

| Applicable frame (sub) types | Bits 0-3 | Bit 4 | Bits 5-6 | Bit 7 | Bits 8 | Bit 9 | Bit 10 | Bits 11-15 |
|---|---|---|---|---|---|---|---|---|
| QoS Data and QoS Data + CF-Ack frames sent by non-AP STAs that are not a TPU buffer STA or a TPU sleep STA ni a nonmesh BSS | TID | 0 | Ack Policy | A-MSDU Present | TXOP Duration Requested | | | |
| | TID | 1 | Ack Policy | A-MSDU Present | Queue Size | | | |
| QoS Null frames sent by non-AP STAs thar are not a TPU buffer STA or a TPU sleep STA in a nonmesh BSS | TID | 0 | Ack Policy | Reserved | XOP Duration Requested | | | |
| | TID | 1 | Ack Policy | Reserved | Queue Size | | | |

Referring to Table 2, first to fourth bits (bits 0 to 3) of the QoS Control fields 1615, 1625, and 1635 may be a region for TID information. The TID information may be mapped to any one of the eight user priority levels (0 to 7) illustrated above in Table 1.

Values 8 to 15, which can be expressed by the first to fourth bits (bits 0 to 3) of the QoS Control fields 1615, 1625, and 1635 may be reserved values.

For a concise description of FIGS. 16 and 17, it may be assumed that a fifth bit (bit 4) of the QoS Control fields 1615, 1625, and 1635 included in the QoS data frame or QoS null frame is set to 1.

A user STA (i.e., a non-AP STA) according to the present embodiment may report TID information related to the transmission priority level of traffic buffered in the user STA through the first to fourth bits (bits 0 to 3) of the QoS Control fields 1615, 1625, and 1635.

Further, when the fifth bit (bit 4) of the QoS Control fields 1615, 1625, and 1635 is set to 1, the user STA may indicate the amount of traffic buffered in a transmission queue of the user STA using ninth to sixteenth bits (bits 8 to 15) of the QoS Control fields 1615, 1625, and 1635.

In the present specification, the amount of traffic buffered in the transmission queue indicated through the ninth to sixteenth bits (bits 8 to 15) may be referred to as queue size.

A first case is described where all of the first to third frames 1610, 1620, and 1630 are QoS null frames. In this case, it will be understood that the first frame includes only a first MAC header field 1610a without including a field 1617 related to a payload. The second frame 1620 may be understood as a second MAC header including a second QoS Control field 1625. The third frame 1630 may be understood as a third MAC header including a third QoS Control field 1635.

The first frame 1610 of FIG. 16 may be a frame for reporting buffer state information on a frame having a specific TID included in the first transmission queue 1510 of FIG. 15.

In this case, the buffer state information for the first traffic 1501 may be included in the QoS Control field 1615 of the first frame 1610. The buffer state information for the first traffic 1501 may include first TID information (TID 1) indicating the transmission priority level of the first traffic 1501 and first queue size information (Queue Size#1) indicating a buffered amount of the first traffic 1501.

For example, the first TID information (TID 1) may be set to 7 according to the first traffic 1501. The first queue size information (Queue Size#1) may be set to a specific value (x1) ranging from 0 to 255 according to the first traffic 1501.

The second frame 1620 may be a frame for reporting buffer state information on a frame having a specific TID included in the second transmission queue 1520 of FIG. 15.

In this case, the buffer state information for the second traffic 1502 may be included in the QoS Control field 1625 of the second frame 1620. The buffer state information for the second traffic 1502 may include second TID information (TID 2) indicating the transmission priority level of the second traffic 1502 and second queue size information (Queue Size#2) indicating a buffered amount of the second traffic 1502.

For example, the second TID information (TID 2) may be set to 4 according to the second traffic 1502. The second queue size information (Queue Size#2) may be set to a specific value (x2) ranging from 0 to 255 according to the second traffic 1502.

The third frame 1630 may be a frame for reporting buffer state information on a frame having a specific TID included in the second transmission queue 1520 of FIG. 15.

In this case, the buffer state information for the third traffic 1503 included in the QoS Control field 1635 of the third frame 1630 may include third TID information (TID 3) indicating the transmission priority level of the third traffic 1503 and third queue size information (Queue Size#3) indicating a buffered amount of the third traffic 1503.

For example, the third TID information (TID 3) may be set to 5 according to the third traffic 1503. The third queue size information (Queue Size#3) may be set to a specific value (x3) ranging from 0 to 255 according to the third traffic 1503.

A second case is described where the first frame 1610 is a QoS data frame and the second and third frames 1620 and 1630 are QoS null frames. In this case, the first frame 1610 may include a payload a Frame Body field 1617. The second frame 1620 may be understood as a second MAC header including a second QoS Control field 1625. The third frame 1630 may be understood as a third MAC header including a third QoS Control field 1635.

Referring to FIG. 17, a BSR frame of FIG. 17 may be a frame into which first to third frames 1710, 1720, and 1730 are aggregated.

Referring to FIGS. 15 to 17, the foregoing description of FIG. 16 may be applied for a concise description of FIG. 17.

The first frame 1710 of FIG. 17 may be understood as the first frame 1610 of FIG. 16. The second frame 1720 of FIG. 17 may be understood as the second frame 1620 of FIG. 16. The third frame 1730 of FIG. 17 may be understood as the third frame 1630 of FIG. 16. However, buffer state information included in QoS Control fields 1715, 1725, and 1735 of FIG. 17 may be distinguished from the buffer state information of FIG. 16.

A first case is described where all of the first to third frames 1710, 1720, and 1730 are QoS null frames. In this case, it will be understood that the first frame 1710 includes only a first MAC header field 1710a without including a field 1717 related to a payload. The second frame 1720 may be understood as a second MAC header including a second QoS Control field 1725. The third frame 1730 may be understood as a third MAC header including a third QoS Control field 1735.

The first frame 1710 of FIG. 17 may be a frame for reporting buffer state information on a frame having a specific TID included in the first transmission queue 1510 of FIG. 15.

In this case, the buffer state information for the first traffic 1501 may be included in the QoS Control field 1715 of the first frame 1710. The buffer state information for the first traffic 1501 may include first TID information (TID 1) indicating the transmission priority level of the first traffic 1501 and first queue size information (Queue Size#1) indicating a buffered amount of the first traffic 1501.

For example, the first TID information (TID 1) may be set to 7 according to the first traffic 1501. The first queue size information (Queue Size#1) may be set to a specific value (x1) ranging from 0 to 255 according to the first traffic 1501.

The second frame 1720 may be a frame for reporting buffer state information on a frame having a specific TID included in the third transmission queue 1530 of FIG. 15.

In this case, the buffer state information for the fourth traffic 1504 may be included in the QoS Control field 1725 of the second frame 1720. The buffer state information for the fourth traffic 1504 may include fourth TID information (TID 4) indicating the transmission priority level of the fourth traffic 1504 and fourth queue size information (Queue Size#4) indicating a buffered amount of the fourth traffic 1504.

For example, the fourth TID information (TID 4) may be set to 0 according to the fourth traffic 1504. The fourth queue size information (Queue Size#4) may be set to a specific value (x4) ranging from 0 to 255 according to the fourth traffic 1504.

The third frame 1730 may be a frame for reporting buffer state information on a frame having a specific TID included in the third transmission queue 1530 of FIG. 15.

In this case, the buffer state information for the fifth traffic 1505 included in the QoS Control field 1735 of the third frame 1730 may include fifth TID information (TID 5) indicating the transmission priority level of the fifth traffic 1505 and fifth queue size information (Queue Size#5) indicating a buffered amount of the fifth traffic 1505.

For example, the fifth TID information (TID 5) may be set to 3 according to the fifth traffic 1505. The fifth queue size information (Queue Size#5) may be set to a specific value (x5) ranging from 0 to 255 according to the fifth traffic 1505.

A second case is described where the first frame 1710 is a QoS data frame and the second and third frames 1720 and 1730 are QoS null frames. In this case, the first frame 1710 may include a payload a Frame Body field 1717. The second frame 1720 may be understood as a second MAC header including a second QoS Control field 1725. The third frame 1730 may be understood as a third MAC header including a third QoS Control field 1735.

It will be understood that the present specification may further include various embodiments for different buffer state reports of a user STA without being limited to the embodiments illustrated in FIGS. 15 to 17. Alternatively, it will be understood that a user STA according to the present specification may transmit, to an AP, a BSR frame in which first to fifth frames (not shown) corresponding to the first to fifth traffic 1501 to 1505 are aggregated.

Aggregation mentioned in FIGS. 16 and 17 of the present specification can be understood with reference to Section 27.10.4 of IEEE P802.11ax/D1.0, disclosed in November, 2016.

Figure 18:
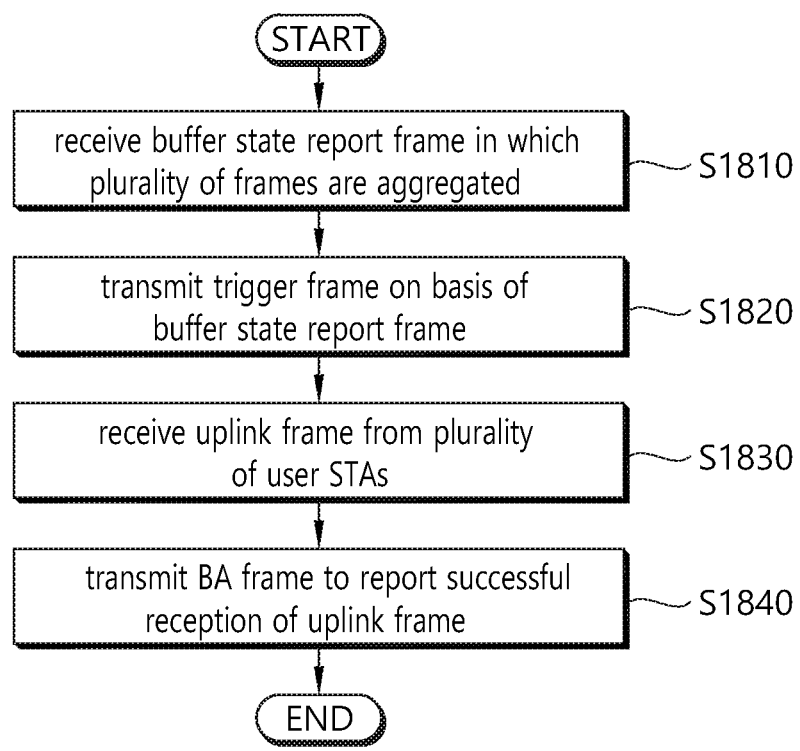
FIG. 18 is a flowchart illustrating an uplink transmission method in a WLAN system according to an embodiment.

FIG. 18 is a flowchart illustrating an uplink transmission method in a WLAN system according to an embodiment.

Referring to FIGS. 1 to 18, in step S1810, an AP may receive a BSR frame, in which a first frame and a second frame are aggregated, from a receiving STA associated with the AP.

For example, the first frame may include a first TID indicating the transmission priority level of first traffic buffered in the receiving STA and first queue size information indicating the amount of the buffered first traffic.

For example, the second frame may include a second TID indicating the transmission priority level of second traffic buffered in the receiving STA and second queue size information indicating the amount of the buffered second traffic.

In this case, the first traffic and the second traffic may be traffic included in the same transmission queue in one user STA. Alternatively, the first traffic and the second traffic may be traffic included in different transmission queues in one user STA.

In step S1820, the AP may transmit a trigger frame for a plurality of user STAs participating in uplink multi-user (UL MU) transmission on the basis of the received BSR frame.

In step S1830, upon receiving the trigger frame, the plurality of user STAs may transmit a plurality of uplink frames using individually allocated resource units according to the trigger frame.

In step S1840, the AP may transmit a block ACK (BA) frame to report the successful reception of the uplink frames. The BA frame will be described in detail with reference to FIGS. 19 and 20.

As described in FIGS. 15 to 18, unlike a conventional user STA reporting the buffer state of each transmission queue on the basis of an AC, a TID-based user STA mentioned in FIGS. 15 to 18 may transmit a BSR frame, in which a plurality of null data frames is aggregated, to an AP.

Accordingly, when the AP according to the present embodiment configures a trigger frame for uplink transmission, a resource unit may be allocated in a more accurate and efficient manner than in the prior art.

Figure 19:
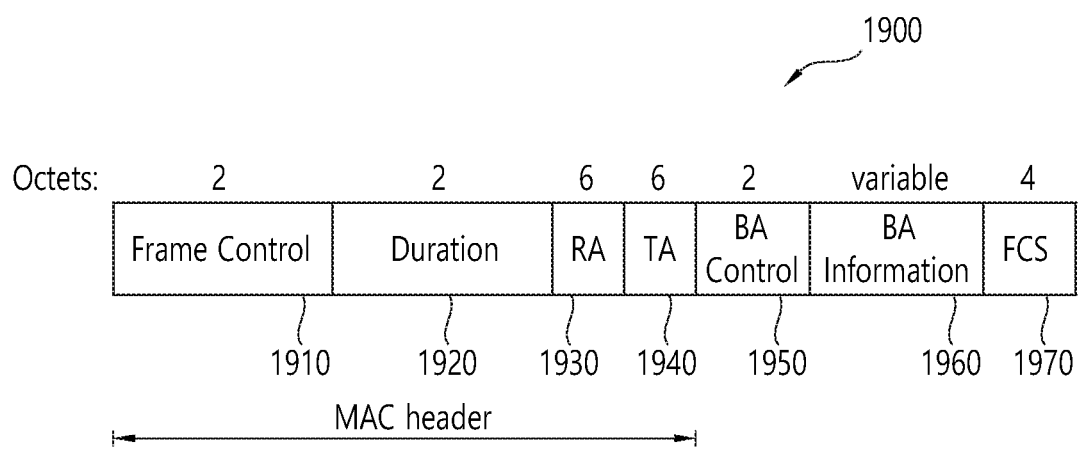
FIGS. 19 and 20 illustrate the format of a BA frame according to an embodiment.
Figure 20:
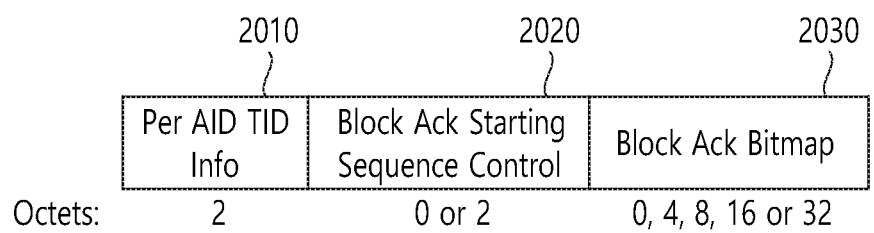

FIGS. 19 and 20 illustrate the format of a BA frame according to an embodiment. Referring to FIGS. 1 to 20, the BA frame 1900 may include a Frame Control field 1910, a Duration field 1920, an RA field 1930, a TA field 1940, a BA Control field 1950, a BA Information field 1960, and an FCS field 1970.

In particular, the BA Control field 1950 is a common control field, and the BA Information field 1960 may be a user-specific field for an individual user STA. The BA Information field 1960 may be separately transmitted to different user STAs. The BA Information field 1960 may include sub-fields of FIG. 20 individually allocated for each user STA.

Specifically, the AP may include identification information (e.g., AID information, ACK scheme information, and TID information) for a plurality of user STAs having transmitted a plurality of uplink frames in a Per AID TID Info field 2010 of FIG. 20.

Further, the AP may notify each user STA of the successful reception of MSDUs or A-MASUs constituting the plurality of uplink frames on the basis of a BA Starting Sequence Control field 2020 and a BA Bitmap field 2030 of FIG. 20.

The BA frame 1900 may be understood as the BA frame mentioned above in FIG. 18. That is, the AP may use the BA frame 1900 in order to notify each user STA of the successful reception of the plurality of uplink frames transmitted from the plurality of user STAs. The BA frame in FIG. 19 is described in detail in Section 9.3.1.9.7 of IEEE P802.11ax/D1.0, disclosed in November 2016.

Figure 21:
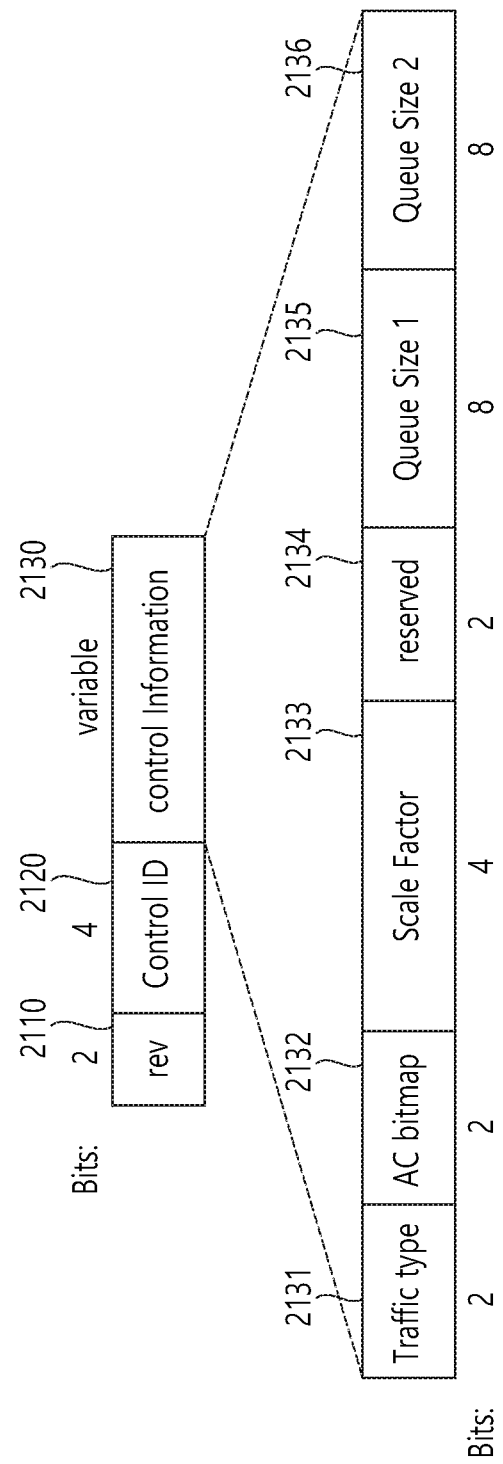
FIG. 21 is a diagram illustrating a field region of a BSR frame according to an embodiment.

FIG. 21 is a diagram illustrating a field region of a BSR frame according to an embodiment.

Referring to FIGS. 1 to 21, a user STA according to the embodiment may transmit buffer state information for a plurality of pieces of TID information (or a plurality of ACs) using HE control headers 2120 and 2130, which are modifications of a HT Control field 2100 (1616 of FIG. 16) as a sub-field of a BSR frame.

Referring to FIG. 21, the user STA of FIG. 21 may perform a buffer state report on a plurality of pieces of TID information for delay-sensitive (DS) traffic.

For example, the TID of the DS traffic may be set to 4 or 5, which is associated with the AC VI type. Alternatively, the TID of the DS traffic may be set to 6 or 7, which is associated with the AC VO type.

The user STA of FIG. 21 may perform a buffer state report on a plurality of pieces of TID information for delay-tolerant (DT) traffic.

For example, the TID of the DT traffic may be set to 1 or 2, which is associated with the AC BK type. Alternatively, the TID of the DT traffic may be set to 0 or 3, which is associated with the AC BE type.

The HT Control field 2100 of FIG. 21 may include a reserved field 2110, a Control ID field 2120, and a Control Information field 2130. In this case, the reserved field 2110 of two bits may be set to 11. The Control ID field 2120 may include four bits for the Control Information field 2130.

The Control Information field 2130 may include 26 bits for buffer state information and may include a plurality of first to sixth sub-fields 2131, 2132, 2133, 2134, 2135, and 2136. The plurality of first to sixth sub-fields 2131, 2132, 2133, 2134, 2135, and 2136 will be described in detail with reference to FIG. 22.

FIG. 22 is a diagram illustrating a plurality of sub-fields of a Control Information field according to an embodiment.

Referring to FIGS. 21 and 22, a Traffic Type field 2210 of FIG. 22 may include two bits and may correspond to the first sub-field 2131 of FIG. 21. The Traffic Type field 2210 may indicate the urgency of traffic, such as DS traffic or DT traffic.

For example, when set to 01, the two-bit Traffic Type field 2210 may indicate DT traffic. In this case, the DT traffic may be traffic associated with the AC BK type or the AC BE type.

For example, when set to 10, the two-bit Traffic Type field 2210 may indicate DS traffic. In this case, the DS traffic may be traffic associated with the AC VI type or the AC VO type.

For example, when set to 11, the two-bit Traffic Type field 2210 may indicate both DT traffic and DS traffic. In this case, queue size information, which will be described later, may be indicated by the total sum of the DT traffic and the total sum of the DS traffic.

For example, when the two-bit Traffic Type field 2210 is set to 00, the remaining region of the Control Information field may be a reserved region. Alternatively, although not shown in FIG. 22, when the Traffic Type field 2210 is set to 00, the remaining region of the Control Information field may be used for buffer state information in which all pieces of TID information are aggregated.

An AC Bitmap field 2220 of FIG. 22 may include two bits and may correspond to the second sub-field 2132 of FIG. 21.

The AC Bitmap field 2220 may be associated with the Traffic Type field 2210 and may indicate an AC bitmap.

Specifically, when DT traffic is indicated by the Traffic Type field 2210 set to 01, the AC Bitmap field 2220 may indicate the presence of AC BE-type and AC BK-type traffic.

For example, when set to 01, the two-bit AC Bitmap field 2220 may indicate the presence of AC BK-type traffic. When set to 10, the two-bit AC Bitmap field 2220 may indicate the presence of AC BE-type traffic. When set to 11, the two-bit AC Bitmap field 2220 may indicate the presence of both AC BK-type and AC BE-type traffic.

Further, when DS traffic is indicated by the Traffic Type field 2210 set to 10, the AC Bitmap field 2220 may indicate the presence of AC VO-type and AC VI-type traffic.

For example, when set to 01, the two-bit AC Bitmap field 2220 may indicate the presence of AC VI-type traffic. When set to 10, the two-bit AC Bitmap field 2220 may indicate the presence of AC VO-type traffic. When set to 11, the two-bit AC Bitmap field 2220 may indicate the presence of both AC VI-type and AC VO-type traffic.

Further, when both DS traffic and DT traffic are indicated by the Traffic Type field 2210 set to 11, the AC Bitmap field 2220 may be a reserved region.

A Scale Factor field 2230 of FIG. 22 may include four bits and may correspond to the third sub-field 2133 of FIG. 21. The Scale Factor field 2230 may include scaling information indicating the amount of buffered traffic in association with the Traffic Type field 2210 and the AC Bitmap field 2220.

A Reserve field 2240 of FIG. 22 may include two bits and may correspond to the fourth sub-field 2134 of FIG. 21.

A Queue Size field 2250 of FIG. 22 may include 16 bits (bits 0 to 15) and may correspond to the fifth and sixth sub-fields 2135 and 2136 of FIG. 21. The Queue Size field 2250 of FIG. 22 may indicate the amount of traffic buffered in a STA in association with the Traffic Type field 2210, the AC Bitmap field 2220, and the Scale Factor field 2230.

For example, when the Traffic Type field 2210 indicates 10 and the AC Bitmap field 2220 indicates 10, first and second bits (bits 0 and 1) among the four bits (bits 0 to 3) of the Scale Factor field 2230 may be set to valid values. In this case, first to eighth bits (bits 0 to 7) of the Queue Size field 2250 may indicate the total amount of traffic buffered in an AC VO-type transmission queue of a STA on the basis of the valid values of the Scale Factor field 2230.

In another example, when the Traffic Type field 2210 indicates 01 and the AC Bitmap field 2220 indicates 11, the first and second bits (bits 0 and 1) of the Scale Factor field 2230 and third and fourth bits (bits 2 and 3) thereof may be set to valid values, respectively.

In this case, the first to eighth bits (bits 0 to 7) of the Queue Size field 2250 may indicate the total amount of traffic buffered in an AC BE-type transmission queue of a STA on the basis of the values set in the first and second bits (bits 0 and 1) of the Scale Factor field 2230. Further, ninth to sixteenth bits (bits 8 to 15) of the Queue Size field 2250 may indicate the total amount of traffic buffered in an AC BK-type transmission queue of a STA on the basis of the values set in the third and fourth bits (bits 2 and 3) of the Scale Factor field 2230.

In still another example, when the Traffic Type field 2210 indicates 10 and the AC Bitmap field 2220 indicates 11, the first and second bits (bits 0 and 1) of the Scale Factor field 2230 and the third and fourth bits (bits 2 and 3) thereof may be set to valid values, respectively.

In this case, the first to eighth bits (bits 0 to 7) of the Queue Size field 2250 may indicate the total amount of traffic buffered in an AC VO-type transmission queue of a STA on the basis of the values set in the first and second bits (bits 0 and 1) of the Scale Factor field 2230. Further, the ninth to sixteenth bits (bits 8 to 15) of the Queue Size field 2250 may indicate the total amount of traffic buffered in an AC VI-type transmission queue of a STA on the basis of the values set in the third and fourth bits (bits 2 and 3) of the Scale Factor field 2230.

In an additional example, when the Traffic Type field 2210 indicates 11, the first and second bits (bits 0 and 1) of the Scale Factor field 2230 and the third and fourth bits (bits 2 and 3) thereof may be set to valid values, respectively.

In this case, the first to eighth bits (bits 0 to 7) of the Queue Size field 2250 may indicate the total amount of traffic buffered in a transmission queue (AC VO or AC VI) associated with DS traffic of a STA on the basis of the values set in the first and second bits (bits 0 and 1) of the Scale Factor field 2230.

Further, the ninth to sixteenth bits (bits 8 to 15) of the Queue Size field 2250 may indicate the total amount of traffic buffered in a transmission queue (AC BK or AC BE) associated with DT traffic of a STA on the basis of the values set in the third and fourth bits (bits 2 and 3) of the Scale Factor field 2230.

It is to be understood that the present specification is not limited to the examples mentioned in FIG. 22 but may further include various embodiments.

Figure 23:
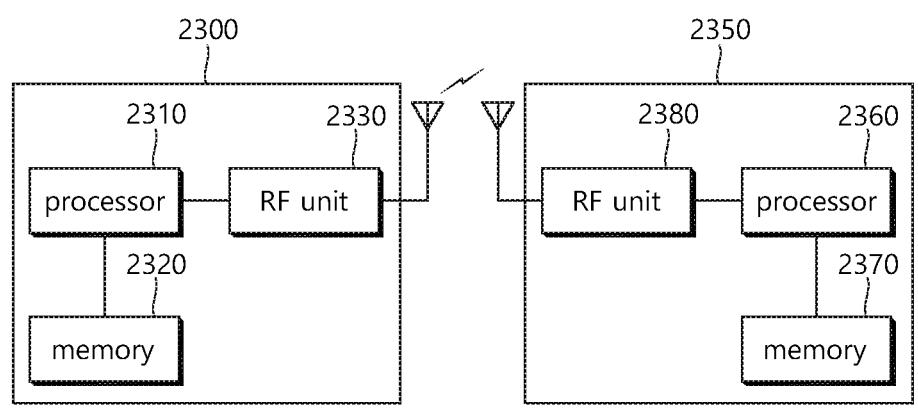
FIG. 23 is a block diagram illustrating a wireless device according to an embodiment.

FIG. 23 is a block diagram illustrating a wireless device according to an embodiment.

Referring to FIG. 23, as an STA that can implement the above-described exemplary embodiment, the wireless device may correspond to an AP or a non-AP station (STA). The wireless device may correspond to the above-described user or may correspond to a transmitting device transmitting a signal to the user.

The AP 2300 includes a processor 2310, a memory 2320, and a radio frequency (RF) unit 2330.

The RF unit 2330 is connected to the processor 2310, thereby being capable of transmitting and/or receiving radio signals.

The processor 2310 implements the functions, processes, and/or methods proposed in the present invention. For example, the processor 2310 may be implemented to perform the operations according to the above-described exemplary embodiments of the present invention. More specifically, among the operations that are disclosed in the exemplary embodiments of FIG. 1 to FIG. 22, the processor 2310 may perform the operations that may be performed by the AP.

The non-AP STA 2350 includes a processor 2360, a memory 2370, and a radio frequency (RF) unit 2380.

The RF unit 2380 is connected to the processor 2360, thereby being capable of transmitting and/or receiving radio signals.

The processor 2360 implements the functions, processes, and/or methods proposed in the present invention. For example, the processor 2360 may be implemented to perform the operations of the non-AP STA according to the above-described exemplary embodiments of the present invention. The processor may perform the operations of the non-AP STA, which are disclosed in the exemplary embodiments of FIG. 1 to FIG. 22.

The processor 2310 and 2360 may include an application-specific integrated circuit (ASIC), another chip set, a logical circuit, a data processing device, and/or a converter converting a baseband signal and a radio signal to and from one another. The memory 2320 and 2370 may include a read-only memory (ROM), a random access memory (RAM), a flash memory, a memory card, a storage medium, and/or another storage device. The RF unit 2330 and 2380 may include one or more antennas transmitting and/or receiving radio signals.

When the exemplary embodiment is implemented as software, the above-described method may be implemented as a module (process, function, and so on) performing the above-described functions. The module may be stored in the memory 2320 and 2370 and may be executed by the processor 2310 and 2360. The memory 2320 and 2370 may be located inside or outside of the processor 2310 and 2360 and may be connected to the processor 2310 and 2360 through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method used in a wireless local area network (WLAN) system, the method comprising:
   receiving, by an access point (AP), a buffer state report (BSR) frame from a receiving station (STA) associated with the AP,
   wherein the BSR frame is configured based on a frame in which a first frame and a second frame are aggregated by the receiving STA,
   wherein the first frame includes a first traffic identifier (TID) related to a transmission priority level of first traffic buffered in the receiving STA and first queue size information related to an amount of the first traffic,
   wherein the second frame includes a second TID related to a transmission priority level of second traffic buffered in the receiving STA and second queue size information related to an amount of the second traffic,
   wherein the first frame is either a Quality of Service (QoS) data frame comprising a payload or a QoS null frame not comprising the payload, and
   wherein the second frame is either the QoS data frame or the QoS null frame; and
   transmitting, by the AP, a trigger frame for a plurality of user STAs participating in uplink multi-user (UL MU) transmission based on the received (BSR) frame.

2. The method of claim 1, wherein the receiving STA comprises a first transmission queue corresponding to a first access category (AC) having a highest priority level, a second transmission queue corresponding to a second AC having a lowest priority level, a third transmission queue corresponding to a third AC having a lower priority level than that of the first AC, and a fourth transmission queue corresponding to a fourth AC having a lower priority level than that of the third AC.

3. The method of claim 1, wherein the first traffic and the second traffic are included in a same transmission queue.

4. The method of claim 1, wherein the BSR frame is transmitted in an unsolicited manner.

5. The method of claim 1, wherein the first TID and the second TID indicate different transmission priority levels.

6. A wireless device in a wireless local area network (WLAN) system, the wireless device comprising:
a transceiver to transmit and receive a radio signal; and
a processor connected to the transceiver,
wherein the processor is configured to:
receive a buffer state report (BSR) frame from a receiving station (STA) associated with the wireless device,
wherein the BSR frame is configured based on a frame in which a first frame and a second frame are aggregated by the receiving STA,
wherein the first frame includes a first traffic identifier (TID) related to a transmission priority level of first traffic buffered in the receiving STA and first queue size information related to an amount of the first traffic,
wherein the second frame includes a second TID related to a transmission priority level of second traffic buffered in the receiving STA and second queue size information related to an amount of the second traffic,
wherein the first frame is either a Quality of Service (QoS) data frame comprising a payload or a QoS null frame not comprising the payload, and
wherein the second frame is either the QoS data frame or the QoS null frame; and
transmit a trigger frame for a plurality of user STAs participating in uplink multi-user (UL MU) transmission based on the received BSR frame.

7. The wireless device of claim 6, wherein the receiving STA comprises a first transmission queue corresponding to a first access category (AC) having a highest priority level, a second transmission queue corresponding to a second AC having a lowest priority level, a third transmission queue corresponding to a third AC having a lower priority level than that of the first AC, and a fourth transmission queue corresponding to a fourth AC having a lower priority level than that of the third AC.

8. The wireless device of claim 6, wherein the first traffic and the second traffic are included in a same transmission queue.

9. The wireless device of claim 6, wherein the BSR frame is transmitted in an unsolicited manner.

10. The wireless device of claim 6, wherein the first TID and the second TID indicate different transmission priority levels.

11. A method used in a wireless local area network (WLAN) system, the method performed by a receiving station (STA) and comprising:
configuring a buffer state report (BSR) frame by aggregating a first frame and a second frame,
wherein the first frame includes a first traffic identifier (TID) related to a transmission priority level of first traffic buffered in the receiving STA and first queue size information related to an amount of the first traffic,
wherein the second frame includes a second TID related to a transmission priority level of second traffic buffered in the receiving STA and second queue size information related to an amount of the second traffic,
wherein the first frame is either a Quality of Service (QoS) data frame comprising a payload or a QoS null frame not comprising the payload, and
wherein the second frame is either the QoS data frame or the QoS null frame;
transmitting the BSR frame to an access point (AP); and
receiving a trigger frame for uplink multi-user (UL MU) transmission from the AP, wherein the trigger frame is configured by the AP based on the BSR frame.

12. The method of claim 11, wherein the receiving STA comprises a first transmission queue corresponding to a first access category (AC) having a highest priority level, a second transmission queue corresponding to a second AC having a lowest priority level, a third transmission queue corresponding to a third AC having a lower priority level than that of the first AC, and a fourth transmission queue corresponding to a fourth AC having a lower priority level than that of the third AC.

13. The method of claim 11, wherein the first traffic and the second traffic are included in a same transmission queue.

14. The method of claim 11, wherein the BSR frame is transmitted in an unsolicited manner.

15. The method of claim 11, wherein the first TID and the second TID indicate different transmission priority levels.

16. A receiving station (STA) in a wireless local area network (WLAN) system, the wireless device comprising:
a transceiver to transmit and receive a radio signal; and
a processor connected to the transceiver,
wherein the processor is configured to:
configure a buffer state report (BSR) frame by aggregating a first frame and a second frame,
wherein the first frame includes a first traffic identifier (TID) related to a transmission priority level of first traffic buffered in the receiving STA and first queue size information related to an amount of the first traffic,
wherein the second frame includes a second TID related to a transmission priority level of second traffic buffered in the receiving STA and second queue size information related to an amount of the second traffic,
wherein the first frame is either a Quality of Service (QoS) data frame comprising a payload or a QoS null frame not comprising the payload, and
wherein the second frame is either the QoS data frame or the QoS null frame;
transmit the BSR frame to an access point (AP); and
receive, via the transceiver, a trigger frame for uplink multi-user (UL MU) transmission from the AP, wherein the trigger frame is configured by the AP based on the BSR frame.

17. The receiving STA of claim 16, wherein the receiving STA comprises a first transmission queue corresponding to a first access category (AC) having a highest priority level, a second transmission queue corresponding to a second AC having a lowest priority level, a third transmission queue corresponding to a third AC having a lower priority level than that of the first AC, and a fourth transmission queue corresponding to a fourth AC having a lower priority level than that of the third AC.

18. The receiving STA of claim 16, wherein the first traffic and the second traffic are included in a same transmission queue.

19. The receiving STA of claim 16, wherein the BSR frame is transmitted in an unsolicited manner.

20. The receiving STA of claim 16, wherein the first TID and the second TID indicate different transmission priority levels.

* * * * *